US006898313B2

(12) United States Patent
Li et al.

(10) Patent No.: US 6,898,313 B2
(45) Date of Patent: May 24, 2005

(54) SCALABLE LAYERED CODING IN A MULTI-LAYER, COMPOUND-IMAGE DATA TRANSMISSION SYSTEM

(75) Inventors: Xin Li, Vancouver, WA (US); Louis J. Kerofsky, Portland, OR (US); Kristine Elizabeth Matthews, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 576 days.

(21) Appl. No.: 10/092,851

(22) Filed: Mar. 6, 2002

(65) Prior Publication Data

US 2003/0169932 A1 Sep. 11, 2003

(51) Int. Cl.[7] .................................................. G06K 9/34
(52) U.S. Cl. ..................... 382/176; 382/181; 382/190; 382/232
(58) Field of Search ................................ 382/176, 190, 382/181, 232, 243; 358/296, 468; 345/172; 707/200; 715/533

(56) References Cited

U.S. PATENT DOCUMENTS

| | | | |
|---|---|---|---|
| 5,778,092 A | | 7/1998 | MacLeod et al. ........... 382/176 |
| 5,809,167 A | * | 9/1998 | Al-Hussein ................. 382/190 |
| 5,854,853 A | * | 12/1998 | Wang ......................... 382/176 |
| 6,058,214 A | | 5/2000 | Bottou et al. ............... 382/240 |
| 6,192,155 B1 | * | 2/2001 | Fan ............................ 382/232 |

OTHER PUBLICATIONS

D. Cheng and C. Bouman, "Document Compression Using Rate–Distortion Optimized Segmentation ", J. Electronic Imaging 10(02), Apr. 2001, pp. 460–474.

X. Li et al., "Block–based Segmentation and Adaptive Coding for Visually Lossless Compression of Scanned Documents", ICIP'2001.

(Continued)

*Primary Examiner*—Anh Hong Do
(74) *Attorney, Agent, or Firm*—Marger Johnson & McCollom, PC

(57) ABSTRACT

A data coder prepares a frame of data for transmission over a data channel. The frame is first broken into a series of non-overlapping blocks. The blocks are analyzed to determine if they are a "picture" block or a "non-picture" block. Picture blocks are compressed to produce one or more layers of data, including a base layer and, optionally, one or more enhanced layers. Non-picture blocks are similarly compressed, but according to different compression procedures. Prior to sending the compressed layers of data to a scheduler for transmission on the data channel, the blocks are checked to see if they have changed more than a threshold amount from the last time they were sent. If the block has changed more than the threshold, the changed block is sent to the scheduler, in compressed form. If the block has not changed more than the threshold, only an indication of the block, and not the block itself, is sent to the scheduler.

41 Claims, 9 Drawing Sheets

OTHER PUBLICATIONS

R.L. de Queiroz et al., "Optimizing Block–Thresholding Segmentation For Multi–Layer Compression Of Compound Images", IEEE Trans. on Image Processing, vol. 9, Sep. 2000, pp. 1461–1471.

M. J. Weinberger , "The LOCO–1 Lossless Image Compression Algorithm: Principles and Standardization into JPEG–LS", IEEE Transactions On Image Processing, vol. 9, No. 8, Aug. 2000, pp. 1309–1324.

D. Taubman, "High Performance Scalable Image Compression with EBCOT", IEEE Transactions On Image Processing, vol. 9, No. 7, Jul. 2000, pp. 1158–1170.

W. Zeng et al., "An Efficient Color Re–Indexing Scheme For Palette–Based Compression", Proceeding of ICIP'2000, Vancouver, Canada.

A. Said and A. Drukarev, "Simplified Segmentation for Compound Image Compression", Proceeding of ICIP'1999.

L. Bottou et al., "High Quality Document Image Compression with DjVu", Journal of Electronic Imaging, vol. 7, Jul. 1998, pp. 410–425.

A. Said and W. Pearlman, "A New Fast and Efficient Image Codec Based on Set Partitioning in Hierarchical Trees", IEEE Trans. CSVT, vol. 6, Jun. 1996, pp. 243–250.

W. Sweldens, "The Lifting Scheme: A Custom–Design Construction Of Biorthogonal Wavelets", Wavelet Applications in Signal and Image Processing III, Proc. SPIE 2569, 1995, pp. 68–79.

D. Taubman and A. Zakhor, "Multirate 3–D Subband Coding of Video", IEEE Trans. On Image Processing, vol. 3, No. 5, Sep. 1994, pp. 572–588.

F. Ono et al., "Bi–Level Image Coding With Melcode— Comparison Of Block Type Code And Arithmetic Type Code", IEEE Globecom'1989, pp. 255–260.

A. Said and W. Pearlman, "An Image Multiresolution Representation for Lossless and Lossy Compression", IEEE Trans. Image Processing, vol. 5, No. 9 pp. 1303–1310.

* cited by examiner

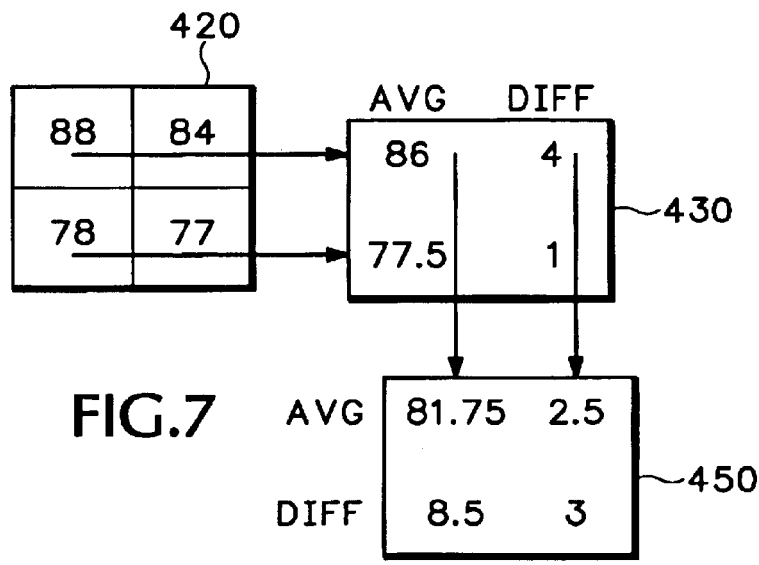
FIG.6
FIG.7
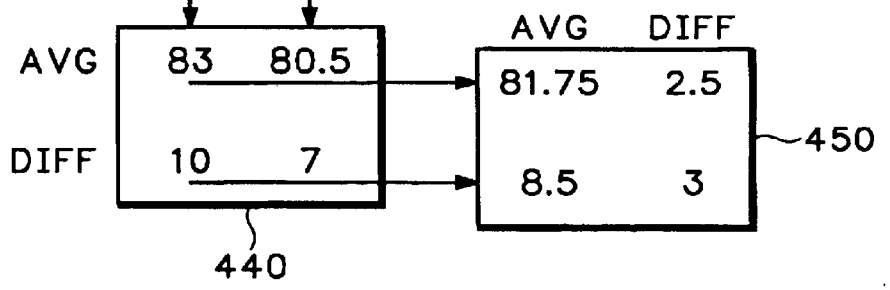
FIG.8

| 99.5 | 1 | 77.75 | −125.5 |
|---|---|---|---|
| 0 | 0 | 61.5 | −119 |
| 73.5 | 53 | 93 | −34 |
| −33 | 66 | 45 | −74 |

~470

| AVG. | AVG. | H.DIFF | H.DIFF |
|---|---|---|---|
| AVG. | AVG. | H.DIFF | H.DIFF |
| V.DIFF | V.DIFF | D.DIFF | D.DIFF |
| V.DIFF | V.DIFF | D.DIFF | D.DIFF |

~480

| 99.5 | 77.5 | 1 | −125.5 |
|---|---|---|---|
| 73.5 | 93 | 53 | −34 |
| 0 | 61.5 | 0 | −119 |
| −33 | 45 | 66 | −74 |

~490

| AVG. | H.DIFF | H.DIFF | H.DIFF |
|---|---|---|---|
| V.DIFF | D.DIFF | H.DIFF | H.DIFF |
| V.DIFF | V.DIFF | D.DIFF | D.DIFF |
| V.DIFF | V.DIFF | D.DIFF | D.DIFF |

|         |       |    |      |
|---------|-------|----|------|
| 85.9375 | 1.125 | 1  | −125 |
| 5.375   | 41.25 | 53 | −34  |
| 0       | 61.5  | 0  | −119 |
| −33     | 45    | 66 | −74  |

520

|    |    |      |
|----|----|------|
| X4 | X2 | X1   |
| X2 | X1 |      |
| X1     | X1/2    |

530

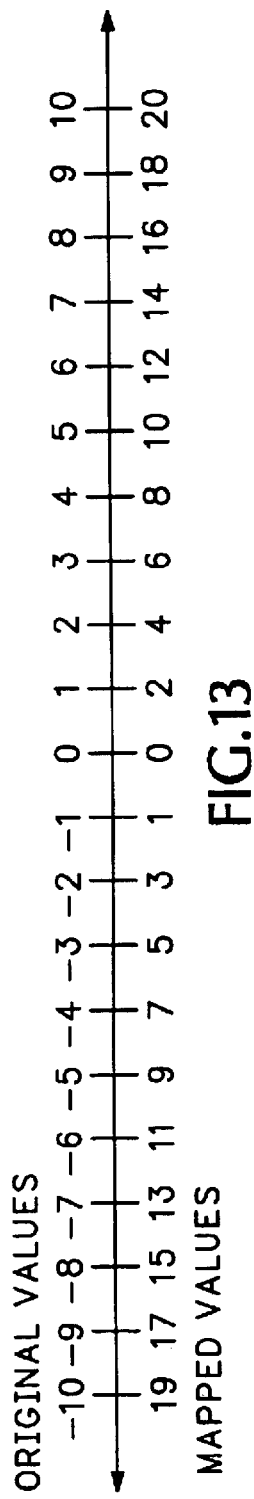

SCALABLE LAYERED CODING IN A MULTI-LAYER, COMPOUND-IMAGE DATA TRANSMISSION SYSTEM

TECHNICAL FIELD

This disclosure relates to data coding and, more particularly, to a data coding system that can encode compound image sequences into different layers for transmission over a data network using minimal complexity.

BACKGROUND

Modern real-time audio and/or video data transmission systems include an encoder to encode an audio or video input stream into transmittable data, a data channel for transmitting the encoded data, and a decoder for decoding the transmitted data and re-creating the audio or video stream at a receiver. Because simply encoding the input stream would result in an extremely large data file, typical encoders also compress the audio or video data to make a smaller data file to be transmitted.

Timely transmission of time-sensitive data, such as real-time audio and video, where slow moving or incomplete video or audio is easily perceived, is difficult to achieve. One problem is that, because of bandwidth constraints of the data channel, it takes a relatively long time to send quality images from the transmitter to the decoder. In many applications, having a large time delay is unacceptable.

Encoding compound images, which are images that contain different types of sub-images or text within a single image frame, is especially difficult because an encoding process that works well with one particular type of sub-image may not work well with other types.

Present encoders typically operate well at a fixed or moderately fixed compression level. For instance a particular encoder may encode a series of frames very well when compressing them to a high degree to meet a low data transmission requirement, but not compress them very well when the data transmission requirements are more relaxed.

Rate scalable coding is a type of coding that uses the same procedures for coding an image or series of images to a desired one of a number of ending data rates. The coding procedures are applied at different strengths based on the desired ending datarate. Using rate scalable coding for compound images is especially difficult. Previous rate scaling systems that compress photographic images (non-compound images) are not equipped to adequately compress a compound-image source. Previous compression systems that are equipped to compress a compound-image source are not adequately equipped to be rate scaleable.

A further problem exists in that data coders, especially encoders and decoders for video data, are typically complicated and require a large amount of computation power to adequately compress and decompress images. There is a large market for coding systems that are less expensive than current systems, but reducing the cost of coding systems almost necessarily requires that the ability to perform complex operations be reduced. Performing coding operations that can maintain good quality while also using less computing power remains an elusive goal.

The present invention addresses this and other problems associated with the prior art.

BRIEF DESCRIPTION OF THE DRAWINGS

FIG. 6 is a diagram showing data making up a sample picture block.

FIG. 7 is a diagram showing a method of encoding the picture data given in FIG. 6, according to embodiments of the invention.

FIG. 8 is a diagram showing another method of encoding the picture data given in FIG. 6, according to embodiments of the invention.

FIG. 9 is a diagram showing further encoding and arranging the picture data given in FIG. 6, according to embodiments of the invention.

FIG. 13 is a chart showing how data values can be re-mapped, according to an embodiment of the invention.

FIG. 14 is a block diagram showing how pixel values can be decoded back into an image, according to embodiments of the invention.

DETAILED DESCRIPTION OF THE PREFERRED EMBODIMENTS

The invention is directed to a scaleable data coding system able to transmit varying degrees of quality of compound images over time, and the environment in which such a system operates. Embodiments of the invention include a data encoder that encodes a compound frame of data into a series of base layers and one or more series of enhancement layers using minimal computation power.

Initially, an image data frame is divided into blocks, and the blocks are classified into types. Depending on the type of block in the frame, a different type and possibly a different amount of compression is applied to the block, and the blocks are coded into layers. A first layer is called a base layer, and is transmitted to a decoder immediately without delay. The decoder then decodes the base layer into an image that is adequate, but lacks full detail of the original image. However, the base layer, because it was coded to be quite small, is transmitted to the decoder with very little delay, thus a recognizable image is produced at the display with a very short delay. Then, additional layers of the coded block data are transferred to the decoder, which enhances the image. Eventually, as the additional layers are received, the image produced by the decoder becomes visually identical to the original image coded by the encoder. Subsequent image frames are similarly coded and sent to the decoder, thus producing a series of images on the target display.

Embodiments of the invention also include time compression techniques, such as comparing blocks from a current image to blocks from a previous image. If the blocks have not changed from the previous image (e.g. blocks making up a static background), they are not again encoded, but rather the encoder sends a signal to the decoder to reuse the block from the previous frame in the current frame. This saves bandwidth of the transmission line, and allows better images to be re-created at the target display in less time.

Figure 1:
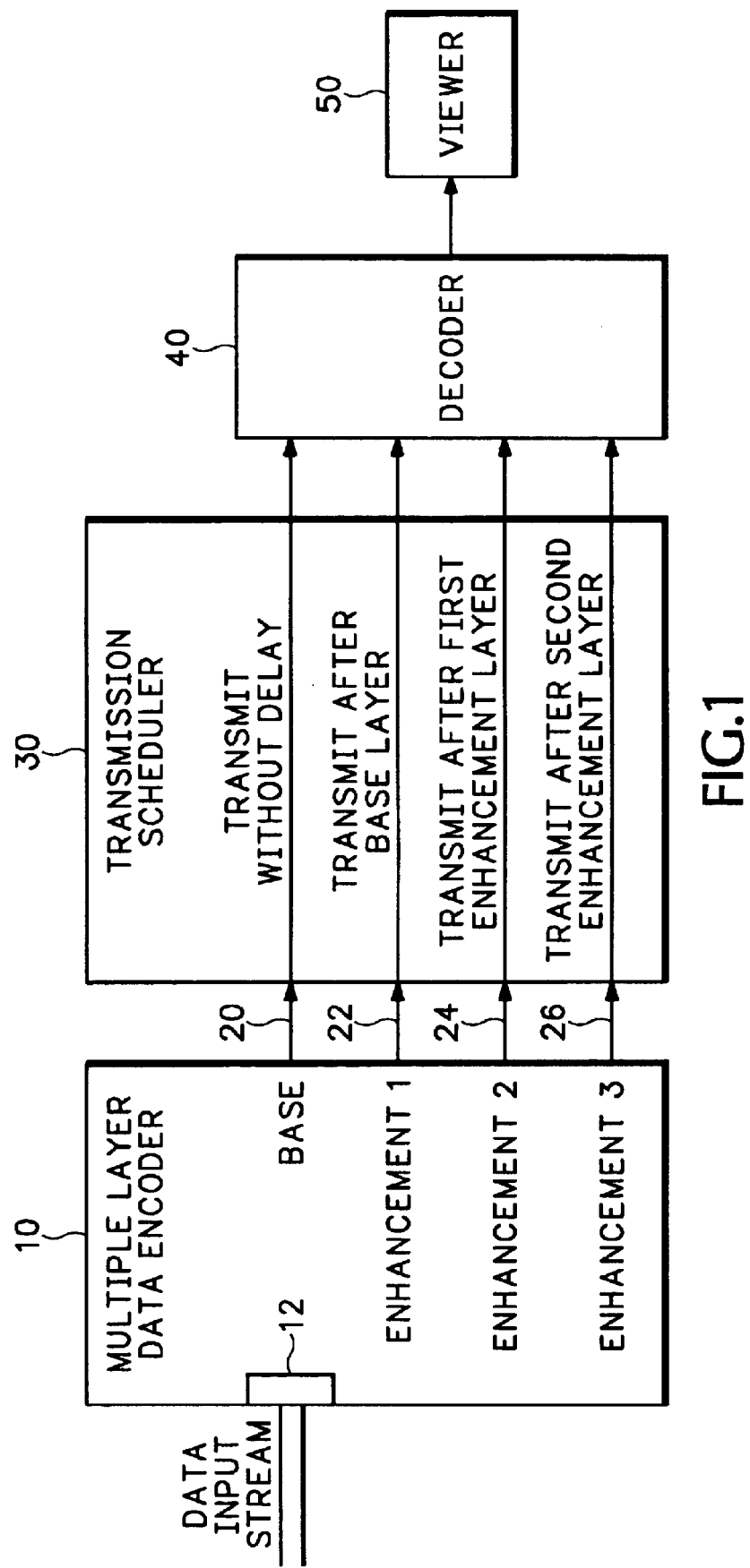
FIG. 1 is a block diagram showing components of a transmission system according to embodiments of the invention.

FIG. 1 is a block diagram showing a data coding system according to embodiments of the invention, and the environment in which it operates. A data encoder 10 receives a data input stream at an input 12. The data input stream could be video, audio, or other data; and it need not be a continuous data stream but may have gaps in it. For example, the data input stream could be a recording of a speaking presentation where there are several time gaps, for instance between words, or at other times while the presenter is not speaking. Or, the data input stream could be a video slide show where slides are only changed every so often, or a video where a large percentage of the picture does not change very much or very often.

The encoder 10 encodes the data received at the input 12 into a base layer 20 and at least one enhancement layer 22, and maybe even an additional number of enhancement layers 24, 26. There is no upper limit on how many enhancement layers 22, 24, 26 that the encoder 10 could produce, but this number would be determined when implemented. In one particular embodiment, explained below, the encoder 10 produces a base layer 20, and three enhancement layers 22, 24 and 26.

To encode the data into the layers, the encoder 10 first divides a frame of data into several blocks, each having a predetermined size. The blocks are divided by type, and labeled as being either a picture type, or a non-picture type. Picture type blocks are compressed using a compression system specially implemented to compress picture blocks. Non-picture type blocks are compressed using a compression system specially implemented to compress non-picture blocks. Both types of the blocks are coded into base layers 20, and the one or more related enhancement layers 22, 24, 26. In some embodiments, each of the individual blocks will be coded into its own base layer 20, thus there will be as many base layers 20 in a frame as there are blocks in the frame. However, for clarity, the base layer 20 will be referred to as a single layer, even though the frame actually includes many base layers 20. The same applies for the enhancement layers 22, 24, 26 in that they will be referred to in the singular, even though many enhancement layers (from each of the blocks) can make up an enhancement "layer" 22, 24, 26 of a frame.

Each of the encoded layers, including the base layer 20 and any enhancement layers 22, 24, 26, produced by the encoder 10 are sent to a transmission scheduler 30. The transmission scheduler 30 acts as a gatekeeper to a data transmission channel between it and one or more decoders 40 (only one decoder shown). This transmission channel could be a bus within a computer, a LAN connection between two or more computers, or a connection between a computer and the Internet or another network. The transmission scheduler may include rate control operations.

The transmission scheduler 30 first sends the base layer 20 to the decoder 40 as soon as the scheduler receives it, with minimal or no delay. Then the scheduler 30 then sends the enhancement layers 22, 24, 26 to the decoder 40 after the base layer 20 has been sent, i.e., when there is enough bandwidth on the transmission channel. Sending additional enhancement layers 24, 26 continues until a maximum time period has elapsed from the time the base layer 20 was sent. For instance, the transmission scheduler may be required to stop sending layers once a time period of one second has elapsed from beginning to send the original base layer 20. If there is only enough bandwidth to send the base layer 20 and the first enhancement layer 22 over the transmission channel, then only those layers will be sent, and the second enhancement layer 24 will not be sent. This procedure applies to all of the enhancement layers encoded by the encoder 10. The transmission scheduler 30 continues to try to send all of the enhancement layers 22, 24, 26 until the decoder 40 can no longer utilize them, e.g., until a different image is generated or until the time constraints of sending the layers are reached.

The decoder 40 receives the encoded data layers 20, 22, 24, 26 sent by the transmission scheduler 30 and generates an image on one or more display devices 50 as the layers are received. For clarity, only one display device 50 is shown in FIG. 1. The decoder 40 includes software or hardware functions that allow it to decode and/or recreate a video image even if that image is sent to it in more than one layer. For instance, the decoder 40 will create, as best it can, the image after having received only the base layer 20 of the different blocks of the present image. The first image created will be of useable quality, but lacking in the full detail of the original image because the additional detail will be in the one or more enhancement layers 22, 24, 26.

When the decoder 40 receives the one or more enhancement layers 22, 24, 26, the decoder automatically increases the quality of the generated video image, and updates the previous image shown on the display device 50. In some alternative embodiments, the decoder 40 may buffer or otherwise locally store the received image for a time prior to showing it on the display device 50 so that the best possible image can be initially created. If parameters determine that the image must be shown as soon as possible, however, then the decoder 40 will not delay generating its image any longer than is necessary.

Although shown as distinct blocks in FIG. 1, the encoder 10 and scheduler 30 could be implemented together in one device or circuit. FIG. 1 is a block diagram of the functions described and does not necessarily show how those functions are implemented.

Thus, transmitting and decoding the base layer 20 immediately allows a recognizable image to be created at the target display 50 and, over time, details are added by transmitting and decoding the enhancement layers 22, 24, 26. While it is always preferable to have an image created by both the base layer 20 and any enhancement layers 22, 24, 26, it is not absolutely necessary to send more than the base layer 20 to create an image that can be recognized.

Figure 2:
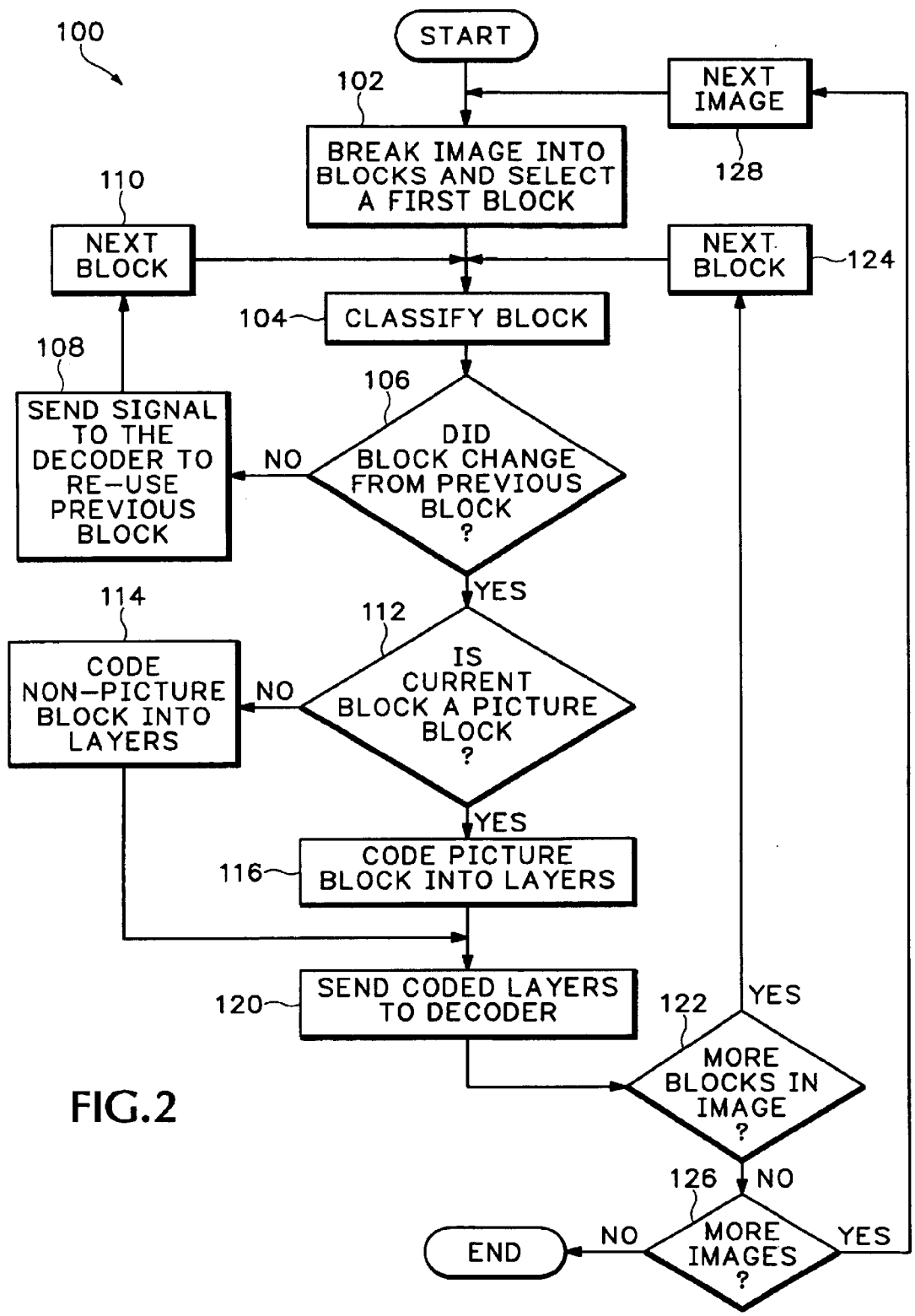
FIG. 2 is a flow diagram showing how a frame of data is encoded into multiple layers, according to embodiments of the invention.

FIG. 2 is an example flow diagram of an encoding system that can be used in the encoder 10 shown in FIG. 1. The flow 100 begins at step 102 by breaking a single image frame (which could be an image frame or other type of data frame, such as audio) into a series of non-overlapping blocks. Typical block sizes used in the encoder 10 are 16×16 picture elements (pixels) or 32×32 pixels. Using a small block size keeps the memory requirements of the encoder 10 low, but any block size could be used and still stay within the spirit and fall under the scope of the invention.

Next, step 104 classifies the blocks as being either a picture type block or a non-picture type block. Generally, picture blocks have many different colors of pixels, none of which are particularly dominant, while non-picture blocks have a relatively few number of dominant colors. More detail of classifying the types of blocks making up the current frame is given below.

Then, step 106 determines if the next block to be sent from the encoder 10 has changed very much from the last time the block was sent from the encoder. This will necessarily always be true for each of the blocks making up the first frame of image data.

Other than in the first block, this step is possible because the frames that are presented to the encoder 10 are typically the same size, e.g. 148×124 pixels. Therefore, the framework of the individual blocks that make up the frames generally does not change from frame to frame, although the contents of the blocks may change. Step 106 determines if the contents of a block have changed from the last time the block was sent by the encoder 10. If the block contents have not changed (or in some embodiments, have changed very little), step 108 sends a signal to be sent to the decoder 40 to re-use the same block as was sent for the previous frame. Then the flow 100 moves to the next block in the frame in step 110 and returns to step 104 to classify the next block and determine if it has changed from its previous frame. If instead the block contents have changed, then the flow 100 continues to step 112.

After the block type has been identified and it is determined that the block has changed from the same block in the previous frame, step 112 separates the block into one of the two categories, picture block or non-picture block. If the block is a non-picture block, it is coded into a base layer and one or more enhancement layers in step 114, while if the block is a picture block, it is coded into a base layer and one or more enhancement layers in step 116. Detail of the coding procedures follows.

Step 120 sends the coded layers to the decoder by first sending the base layer, and then sending the enhancement layers after the base layer has finished transmitting, provided there is enough bandwidth available. If there is not enough bandwidth available, in some embodiments of the invention, the uppermost enhancement layers can be dropped. Once the layers have been sent in step 120, the flow 100 checks to see if there are more blocks in the image in step 122. If so, step 124 increments to the next block and returns to step 104 and repeats the process for the next block. If there are no more blocks in the current image, step 126 determines if there are more images to encode. If so, step 128 increments to the next image and the entire flow 100 repeats. Once there are no more images to encode, the flow 100 ends.

Detailed discussion of the implementation of the steps in flow 100 follows.

Classification of Block Types

One way of classifying the blocks of the current frame as being either picture blocks or non-picture blocks is to perform a quantization of the individual pixels making up the block, and perform an analysis on the quantization. Generally, this step counts the separate colors making up a particular block, and classifies the blocks according to how many colors are in the block and how dominant the colors are. Non-picture blocks are defined as those having a few, dominant colors, for example text and static background. Picture blocks are made of many non-dominant colors.

One way to perform such a quantization is to process an individual block of data in scanning order, i.e. in the same way it will be eventually painted on the display 50. A codebook of colors is generated that stores the list of colors in the block, how often they are used, and possibly a color threshold variable. The color threshold variable allows technically different colors to be classified as the same color if the colors are within the color threshold variable amount of one another.

In the beginning of the process, the codebook of colors is initialized to all zeros, and the color of the first pixel in the block examined. If the color of the current pixel does not appear in the codebook or within the color threshold amount of any colors within the codebook, and in the case of the first pixel it will not already appear in the codebook, then the color is added to the codebook. Additionally, the frequency of the first color will be changed to "1", as will the count of the total number of colors that are in the codebook. The next pixel is then examined.

If the second pixel in the current block is within the color threshold amount of color of the first pixel, the frequency of the first color is incremented to "2", otherwise, the color of the second pixel in the block is added to the codebook, and the count of number of colors in the codebook is incremented to "2". This process continues until all of the colors in the block have been examined and included in the codebook with their frequency of use, or until the number of colors in the codebook exceeds one-fourth the total number of pixels in the block. In such a case, the block is defined to be a picture block, because there are so many different colors in the block.

Once the entire codebook of colors in the block has been created, it is analyzed to determine how many dominant colors are in the block, and how dominant those colors are. If a particular color has a frequency of use over a frequency threshold, it is declared to be a dominant color. For instance, a color may be selected as being dominant if it appears more than 3 times in a 32 pixel block, where 3 is the frequency threshold.

In one embodiment, if there are eight or fewer dominant colors, and the dominant colors make up more than a total percent threshold of the total colors in the block (e.g. 90%), then the block is classified as being a non-picture block. Otherwise, if there are more than eight dominant colors, or if all of the dominant colors do not make up more than 90% of total colors of the block, then the block is classified as a picture block. Such classification is necessary because, as described above, the different blocks will be coded and compressed differently, based on which type of blocks they are.

By having so many variables in the analysis, e.g., the color threshold variable, the frequency threshold, and the total percent threshold, the classification of block types is easy to modify or tune for better performance in a specific desired implementation.

The block classifier can be implemented in a number of ways, in either software or hardware. For instance, the block classifier could be a standalone circuit, having an input terminal for receiving the data making up a block, and having one or more output terminals indicating whether the block is a picture block or a non-picture block. Alternatively, the block classifier could be a portion of an integrated circuit providing the same function. Still, too, the block classifier could be a module, thread, or procedure running on a dedicated or general purpose processor, and having appropriate input and output variables.

Coding of Non-picture Blocks

Once the type of block is known from the above section, the block is coded into layers prior to sending it to the scheduler 30 (FIG. 1) for scheduled delivery to the decoder 40. One method of coding the non-picture blocks with a process that is scaleable is to use an integer-to-integer transform to down-sample the original non-picture block into a series of layers, encode those layers, and send them individually to the decoder 40. Because of the repeating tendencies of pixels in non-picture blocks, generally, non-picture blocks can be compressed to a greater degree than picture blocks. Therefore, embodiments of the invention use specific coding methods particularly well suited to compress non-picture blocks.

A. Creating the Color Palette

Recall that non-picture blocks are those having only few colors. Because colors are typically designated by a 24 bit code (8 each for Red, Green and Blue), it takes a large amount of bandwidth to send all 24 bits for every pixel making up the block Therefore, embodiments of the invention use a color palette of only the colors actually used in a non-picture block, and then send only an index of that color palette to indicate a color of the pixel in the block, rather than sending the entire 24 bit color for every pixel. Examples of this process, plus further encoding are described below.

As described in the above section, a color codebook is used to help determine if a particular block is either a picture or non-picture block. The color codebook can then be used as the color palette for the non-picture blocks.

Figure 3:
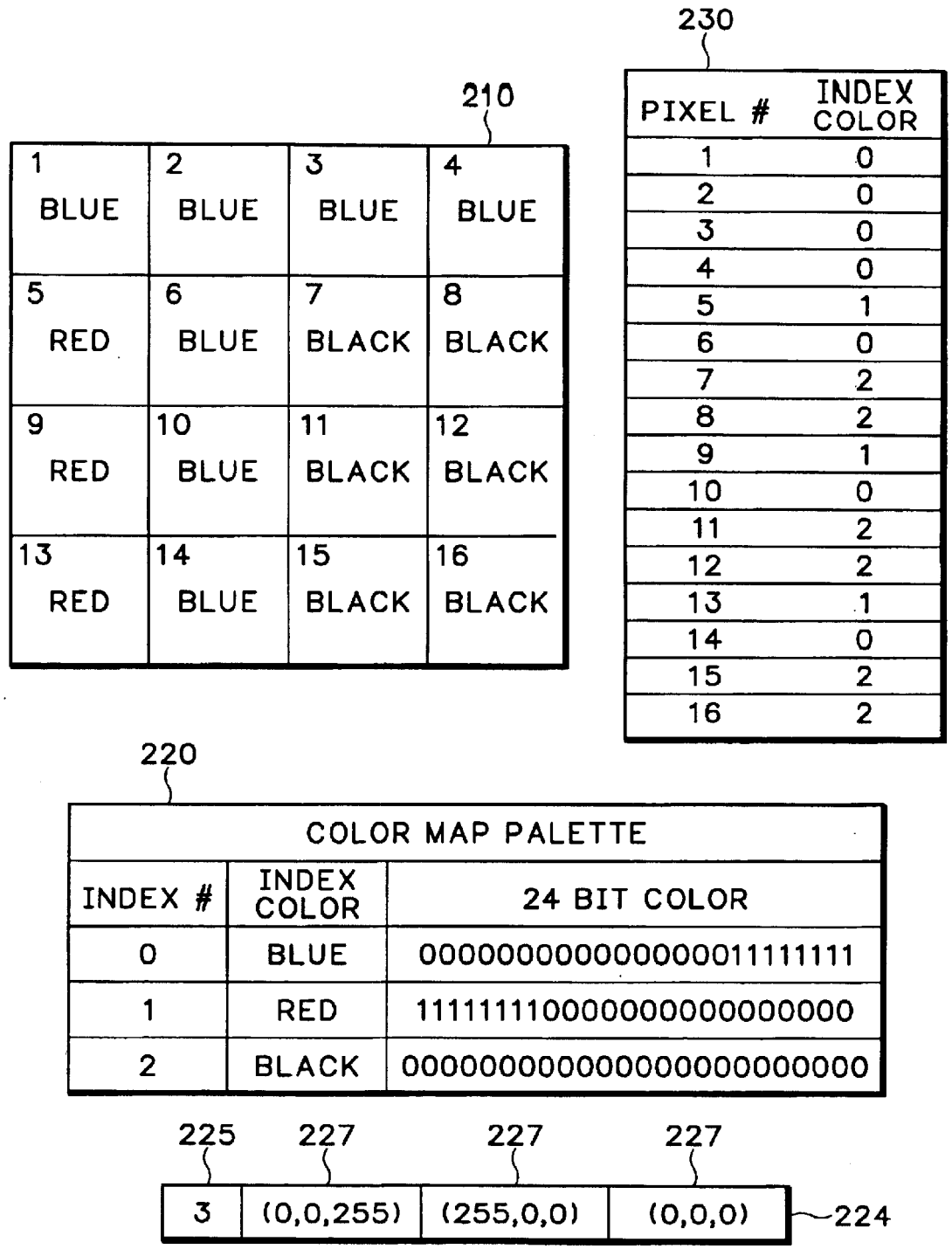
FIG. 3 is a diagram illustrating a system for coding a non-picture block, according to embodiments of the invention.

FIG. 3 shows an example non-picture block 210, a color codebook or palette 220 made from the non-picture block, a data structure 224 encoding the color palette, and a color index map 230 of the non-picture block. The block 210 is only 4×4 pixels for simplicity, but would typically be formed of 32×32 pixels or some other size.

There are only three colors in the example block 210, blue, red, and black, although a typical block may have as many as 16 or so different colors. As can be seen in the color palette 220, each of those colors is assigned an index number along with its 24 bit color, with 0 designating a blue color, 1 for red and 2 for black. A data structure 224 can then be assembled and sent to the decoder 40 (FIG. 1), where it is stored for later use in re-creating the block 210 for display. The data structure 224 includes a first field 225 that signals to the decoder 40 how many colors are in the color palette. In the case of the color palette 220 of FIG. 3, this number is three. The remaining fields 227 in the data structure are the 24 bit colors themselves, in uncompressed form. The order in which the color fields 227 are received by the decoder 40 indicates which index position the colors are in, e.g. blue is color 0, red is color 1 and black is color 2. Because of this color palette index system, the actual 24 bits making up each color need only be transmitted to the decoder 40 one time. The color of a pixel in a non-picture can then be indicated to the decoder simply by sending the index rather than the entire color bit-code; thus, the bandwidth used by sending the non-picture block data is greatly reduced.

The pixel map 230 shows the mapping of pixel positions in numerical order and their associated indexed color. Placing the pixels back into their block order number with their associated index color produces a symbol color block 240 (FIG. 4A), which is a numerical representation of the block 210. Embodiments of the invention create the base layer 20 and one or more enhancement layers 22, 24, 26 from the symbol color block 240, for later sending to the decoder 40 of FIG. 1.

The color codebook generator can be implemented in a number of ways, in either software or hardware. For instance, the color codebook generator could be a standalone circuit, having an input terminal for receiving the pixels making up a block, and having one or more output terminals for delivering the generated color codebook. Alternatively, the color codebook generator could be a portion of an integrated circuit providing the same function. Still, too, the color codebook generator could be a module, thread, or procedure running on a dedicated or general purpose processor, and having appropriate input and output variables.

B. Downsampling the Color Block

One method for creating the base layer 20 (FIG. 1) from the symbol color block 240 (FIG. 4A) that can be achieved with little computational overhead is a downsampling of the data in the symbol color block. In this downsampling method, data from the symbol color block 240 is divided into a number of subsets. The number of subsets created is related to the reduction in size desired from the original color block. In the following example, the symbol color block 240 is divided into 4 subsets, and each of those subsets will become a separate layer for transmission to the decoder. However, embodiments of the invention operate with any degree of sub-setting, and it is not mandatory that each subset of data be coded into its own layer. For instance, subsets can contain any number of bits in the symbol color block 240, and more than one bit from a single subset can be combined into in a single layer. This will be described below.

Figure 4A:
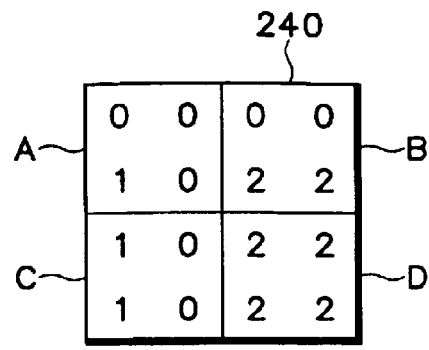
FIG. 4A is a diagram showing data making up a sample non-picture block.

As shown in FIG. 4A, the symbol color block 240 is divided into four subsets, labeled group A, B, C and D, each containing four pixels. In this example there are only four groups because there are only 16 bits in the symbol color block 240, while in most cases there would be 256 groups (32×32 bits divided by four bits per group).

Figure 4B:
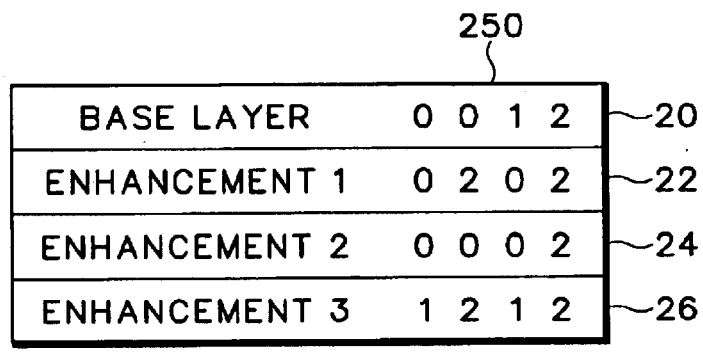
FIG. 4B is a diagram showing how the data from FIG. 4A can be divided into different layers according to embodiments of the invention.

As mentioned above, in this example, each pixel from a particular group can be coded into a separate layer. Because there are four pixels in each group A–D, the pixels can easily be coded into a base layer 20, and three enhancement layers 22, 24 and 26. The layers are referenced together as layers 250 in FIG. 4B. In implementation, the groups A–D may also be compressed (coded) prior to creating the layers 250. Coding the layers 250 will be discussed in the next section.

The base layer 20 is formed from a single bit from each group A–D in the symbol color block 240. For instance, the bit in the upper-left position of group A is "0", which is made to be the first bit in the base layer 20. Then, the bit in the upper-left position of group B, which is also "0", is copied to the second bit in the base layer 20. The upper-left bit in the remaining groups C and D are likewise placed, giving the first four bits in the base layer 20 as 0,0,1,2. If there were more groups, the upper-left bit in those groups would be placed in succession, creating a base layer 20 that is exactly one-fourth the size of the original symbol color block 240, before coding.

Enhancement layers 22, 24 and 26 are likewise created by using bits in the lower-right, upper-right, and lower-left positions in the groups A, B, C, D, respectively. In this embodiment, each of the layers 250 is identical in size (before coding), to the others. Other embodiments may include more than one bit from each group in a single layer. For instance, one bit from each group may create the base layer 20, while two bits are used from each group to make the enhancement layer 22. Then, the remaining bit from each group could be used to make the enhancement layer 24, and not have an enhancement layer 26. This solution would allow a first image to be created very quickly from the base layer 20, but take longer for the first enhancement layer 22 to be transmitted to the decoder 40 and displayed. If there was still enough time left, the second enhancement layer 24 could be sent.

Still other embodiments could break the symbol color block 240 into groups containing more or fewer than four bits and downsample those bits into the base layer 20 and enhancement layers 22, 24, 26 in any combination.

The block divider can be implemented in a number of ways, in either software or hardware. For instance, the block divider could be a standalone circuit, having an input terminal for receiving the block of data, and having one or more output terminals for delivering the different layers. Alternatively, the block divider could be a portion of an integrated circuit providing the same function. Still, too, the block divider could be a module, thread, or procedure running on a dedicated or general purpose processor, and having appropriate input and output variables.

C. Encoding the Layers

Because non-picture blocks use a minimum number of colors, it is likely that many of the color index numbers making up the pre-coded layers 250 will have many repeating numbers. One way to compress a stream of numbers that oftentimes repeat is to perform a run length encoding (RLE) on the original stream, thereby creating a compressed stream. Recall that the encoding should require only a minimum of processing, and therefore some of the embodiments of the invention only perform a minimal RLE, such as a single pass RLE.

Figure 5:
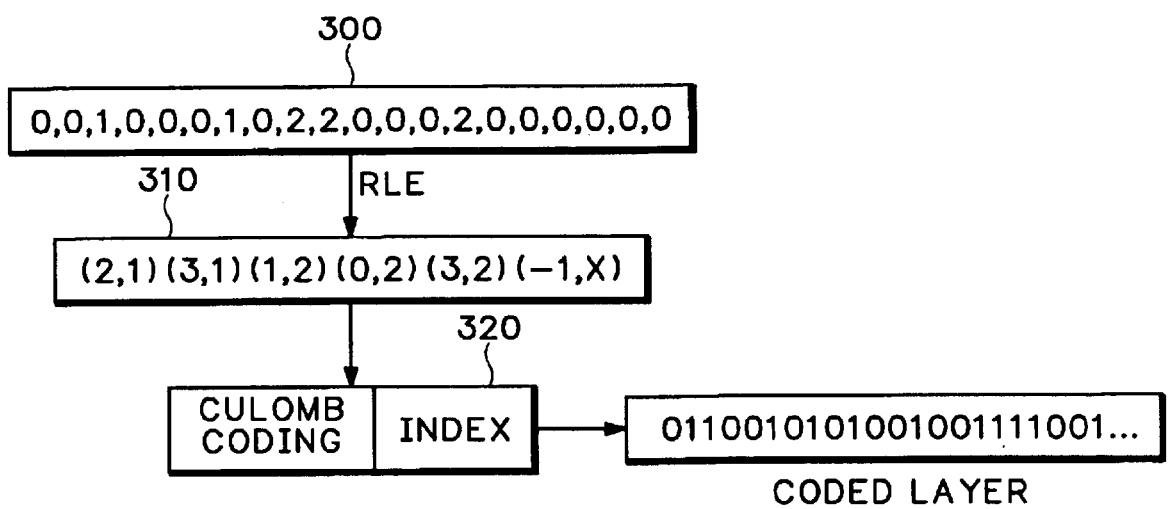
FIG. 5 is a diagram illustrating a system for Run Length Encoding a non-picture block, according to embodiments of the invention.

FIG. 5 shows an example uncompressed data stream 300 that could represent the first numbers of either the base layer 20 or one of the enhancement layers 22, 24, 26, and a set of RLE data pairs 310 generated from the datastream 300. Encoding using a simple type of RLE consists of examining the number of times a particular symbol is sequentially represented in the stream of data, and then coding this information. Typically, the number of zeros is counted, but other symbols could be counted as well. Recall that when the color table was originally created for a non-picture block that the number of times each color was used in a block was counted. The RLE will be most effective in compressing data when the color that was most frequently used is assigned the value that will be counted, e.g., zero.

To RLE the data stream 300, the encoding process begins at the first bit and counts the number of successive zeros. If the data stream 300 begins with a non-zero number, then the number of successive zeros is "0". Otherwise, the encoding process continues until a zero followed by a non-zero number is found. Once the first non-zero number is found, a first data pair is created (run, level), where "run" indicates the number of zeros in the current run, and "level" is the symbol that breaks the run of zeros. In the example of the data stream 300, the first data pair would be (2,1), because there are two initial zeros followed by a "1". This process of counting the number of successive zeros followed by listing the non-zero numbers continues until the end of the data stream 300 is reached. The result of the RLE encoding the data stream 300 is a series of data pairs 310, as shown in FIG. 5. The final pair in the series of data pair 310 typically begins with a "−1" or some other code that indicates the end of the data stream has been reached, or indicates that all of the remaining numbers in the data stream are zero.

Once the RLE data pairs 310 are created, they can be coded as well, to further compact the space used in transmitting the data. One way to adaptively code the RLE data pairs 310 is to code them using an adaptive Golomb coder 320, shown in FIG. 5, which is well known to those skilled in the art. Coding using Golomb coding essentially creates a table having index values of the symbols in the RLE data pairs, and assigns every symbol in the pairs a code made from ones and zeros to indicate which symbol from the RLE data pairs is being transmitted.

Therefore, in some embodiments of the invention, the RLE data pairs 310, after they have been Golomb coded, become one of the layers 250 (base layer 20, enhancement layer 22, etc.) which are sent to the transmission scheduler 30 (FIG. 1) for scheduled delivery to the decoder 40, which in turn creates an image from the layers and presents the image on the viewer 50. Re-creating the non-picture block from the coded layers 250 will be discussed after the coding of picture blocks has been described, in the section below.

The above-described methods of coding a non-picture frame into layers are lossless, in that the non-picture block can be exactly recreated by the decoder 40. Lossy type coding methods that are known in the art can also be used without deviating from the scope of the invention.

The RLE encoder for non-picture blocks can be implemented in a number of ways, in either software or hardware. For instance, the RLE encoder could be a standalone circuit, having an input terminal for receiving the raw data, and having one or more output terminals for delivering the encoded data. Alternatively, the RLE encoder could be a portion of an integrated circuit providing the same function. Still, too, the RLE encoder could be a module, thread, or procedure running on a dedicated or general purpose processor, and having appropriate input and output variables.

Coding of Picture Blocks

Many compression systems are known for scaleable coding of photographic images. These previously known systems are, however, either very complicated to implement (for instance being based on a zero-tree structures), or computationally intensive due to the binary arithmetic involved.

Oftentimes the encoder 10 (FIG. 1) and/or the decoder 40 are not equipped to perform such computationally intensive processes. For instance, an encoder 10 or decoder 40 may be implemented as a low cost-low power consuming process, and not be capable of performing complex calculations quickly. Therefore, embodiments of the invention code picture blocks into the base layer 20 and one or more enhancement layers 22, 24, 26 using a system that is easy to implement and has a low level of computational complexity, thereby allowing relatively quick encoding/decoding of frames with comparatively little computation.

A. Generating Wavelet Codes

A process for performing a wavelet transform is described below. These transforms are typically performed in three color planes, one each for Red, Green and Blue. FIG. 6 shows a picture block 410 including decimal numbers for 16 different pixels having an 8-bit pattern for a single color, e.g. Blue. The picture block 410 would also have 8-bit patterns for its Red and Green pixels, which would also be coded separately in a similar process, but these are not shown in FIG. 6.

The first step in the wavelet coding is to break the block 410 into groups of 4 adjacent pixels, and then perform a horizontal comparison process of the pixels followed by a vertical comparison process of the pixels. As will be shown, the order in which these comparison processes is performed makes no difference to the outcome of the process.

The wavelet coding consists of taking an average and a difference for the group of four pixels, in both the horizontal and vertical direction. FIG. 7 shows an example group 420 including four pixels: 88, 84, 78, and 77. In a first step, the average and difference of the top two pixel values (88, 84) are computed, yielding an average of 86 and a difference of 4. These comparison values are shown in a chart 430. The average and difference of the bottom two pixels (78, 77) of the example group 420 are similarly computed to be 77.5 and 1, respectively, and are also shown in the chart 430. In a second step, the average and difference values just computed are also averaged and compared, in the vertical direction, yielding a second set of numbers, which is shown in a chart 450.

FIG. 8 shows the same process completed in the opposite order, yet yielding the same results. Shown in that figure is the example group 420 first undergoing the vertical averaging and comparing process to yield the numbers in a chart 440. The horizontal process is then performed on the chart 440 to yield the numbers in the chart 450. The numbers in the chart 450 in both FIGS. 7 and 8 are identical regardless of whether the wavelet coding process began with the horizontal or the vertical process. The individual numbers making up the chart 450 represent different values of the data from the original example group 420. For example, the upper-left number in chart 450 is the overall average of all four numbers making up the example group 420. The upper-right number in the chart 450 is computed by taking the average of the horizontal differences (FIG. 7), or is computed by taking the difference of the vertical averages (FIG. 8). The lower-left number 450 is computed by taking the difference of the horizontal averages (FIG. 7), or by taking the average of the vertical differences (FIG. 8). Finally, the lower-right number in the chart 450 is computed by taking the difference of the horizontal distances (FIG. 7), or taking the difference of the vertical differences (FIG. 8). The lower-right number in the chart 450 is also referred to as the "diagonal difference". In each case, computing the values in the chart 450 using either of the two methods yields the same ending value.

FIG. 9 shows a chart 470 containing values transformed from the original picture block 410 of FIG. 6 according to the vertical and horizontal wavelet transforms described above with respect to FIGS. 7 and 8. A mapping 480 shows how the data in the chart 470 can be rearranged to group like-kind data, and a chart 490 contains the same values included in chart 480 but rearranged according to the mapping 480. For example, the four averages of the original sixteen pixels are placed in the upper-left hand corner of the chart 490.

Figures 10, 11, 12:
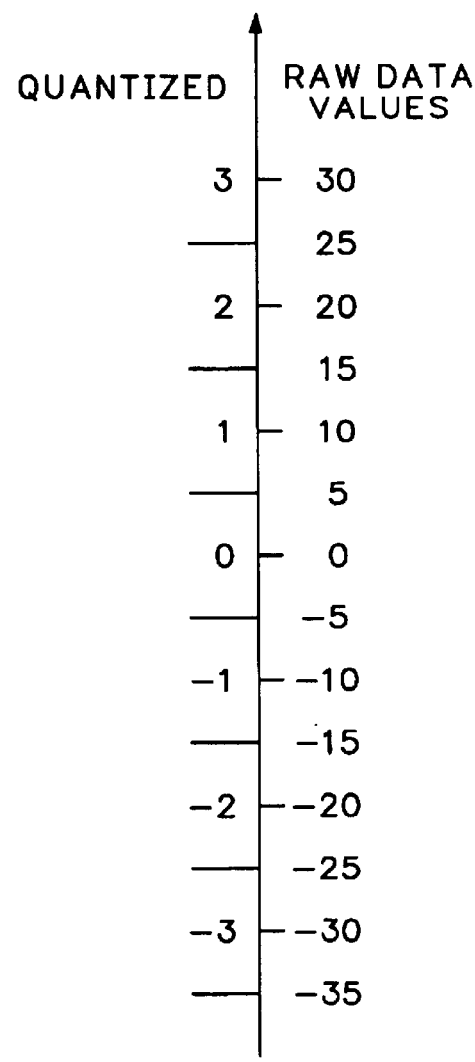
FIG. 10 is a diagram showing the values obtained after coding and arranging the data given in FIG. 6, according to embodiments of the invention.
FIG. 11 is a diagram showing normalization values used with encoded picture data according to embodiments of the invention.
FIG. 12 is a chart showing how data values can be quantized, according to an embodiment of the invention.

Depending on the level of compression desired, another wavelet coding process can be performed on the four averages in the same manner as it was performed for the original data in the picture block 410. Then, the results of this second wavelet coding also can be ordered as shown in the mapping 500, which is similar to the mapping 480, but the upper-left hand quadrant has been replaced by a transformation of the "avg" numbers that were originally in the mapping 480. FIG. 10 shows a chart 520 that includes the wavelet codes produced by performing the wavelet coding process twice, once on the original picture block 410 to produce the data in the chart 490, and then again on only the average data values (upper-left quadrant), which are then assembled into the chart 520 according to the mapping 500.

Some features about performing these procedures are that it is very fast, requiring minimum computation, and yet provides useful results. For instance, the number in the upper-left corner of chart 520 is the overall average of the 16 pixel values in the original pixel block 410 of FIG. 6.

The wavelet coder can be implemented in a number of ways, in either software or hardware. Additionally, individual functions of the wavelet coder can be implemented in different ways. For instance, the portion of the coder that produces the average pixel values need not be implemented in the same way that the portion of the coder that produces the difference wavelets.

One or more portions of the wavelet coder could be a standalone circuit, having an input terminal for receiving the data block, and having one or more output terminals for delivering the wavelets. Alternatively, the wavelet coder could be a portion of an integrated circuit providing the same function. Still, too, the wavelet coder could be a module, thread, or procedure running on a dedicated or general purpose processor, and having appropriate input and output variables.

B. Normalization of the Wavelet Codings

Once the transform wavelets have been coded, as shown in FIG. 10, they are normalized in order to approximate an orthogonal transform. FIG. 11 includes a normalization chart 530 that indicates how to normalize the data stored in the chart 520 of FIG. 10. Values from the chart 520 are multiplied by the factors shown in the normalization chart 530, based on their location in the chart. For instance, the horizontal and vertical difference values in the large squares of the mapping 500 (FIG. 9) are multiplied by "1", i.e., they are left untouched, while the diagonal difference values are actually divided by 2. The remaining values are multiplied by the values shown in the chart 530 to produce the normalized transform numbers. The normalized transform numbers will have additional techniques performed on them prior to converting them into the base layer 20 and the one or more enhancement layers 22, 24, 26.

The wavelet normalizer can be implemented in a number of ways, in either software or hardware. The wavelet normalizer can be a standalone circuit, or can be a portion of an integrated circuit. It may be more convenient to implement the wavelet normalizer as a module, thread, or procedure running on a dedicated or general purpose processor, and having appropriate input and output variables.

C. Quantization of Coefficients

Because the horizontal difference, vertical difference, and diagonal difference wavelets can be a fairly large spread of numbers, and because they can include both positive and negative numbers, the difference wavelets can be quantized and mapped into positive integers prior to performing a RLE process on them. Because the average numbers (the upper-left hand number of mapping 500 (FIG. 9), which although only one average number is shown in mapping 500, our original data block 410 (FIG. 6) only had 16 pixels while up to 1024 pixels is typical) should not have values as widespread as much as the difference numbers, embodiments of the invention may not quantize or RLE process the average numbers, although these processes could be performed.

One form of quantizing is to perform a quasi-decimalization of the difference wavelets. In this process, each of the wavelets from the chart 520 is simply applied to the chart shown in FIG. 12, which effectively divides the values of the difference wavelets by 10 and rounds them to the closest integer. Positive and negative values are maintained. For example, a 26 would map to 3, while a −23 would map to −2. Other quantization processes can be used, such as bit division or others to make the quantized difference wavelets.

The wavelet quantizer can be implemented in a number of ways, in either software or hardware. The wavelet quantizer can be a standalone circuit, or can be a portion of an integrated circuit. It may be more convenient to implement the wavelet quantizer as a module, thread, or procedure running on a dedicated or general purpose processor, and having appropriate input and output variables.

D. Encoding the Layers

Once the difference wavelets have been quantized, they can be RLE processed similar to the encoding process described with reference to non-picture blocks. Prior to RLE processing, the wavelets can be divided along similar types to make the base layer 20 and the enhancement layers 22, 24, 26. For example, the average values (upper-left hand number of chart 520 in FIG. 10) can be used to make up the base layer 20. As described above, the average values may not necessarily be coded because it is not likely that the average color values for pixels in picture blocks would be very repetitive. Therefore, the average values may be directly sent to the scheduler 30 and decoder 40 (FIG. 1) simply as calculated above.

The remaining quantized difference wavelets can be separated into layers based on their type. For example, all of the quantized horizontal wavelets can be RLE processed into the enhancement layer 22 while the quantized vertical wavelets can be RLE processed into the enhancement layer 24 and the quantized diagonal wavelets can be RLE processed into the enhancement layer 26. Of course, embodiments of the invention may choose to place any of the quantized difference wavelets into any of the layers.

If further granularity of layers is required for some applications, a larger number of layers can be created by using a bit plane by bit plane scanning to produce the individual layers. However, this alternative is computationally complex and may not be preferred to be used in a simple coding system.

Another difference between RLE processing the non-picture blocks (described above) and RLE processing the picture blocks is the probability of negative values in the picture blocks. As shown in the chart 520, several of the values are negative, while none of the values for the non-picture blocks of FIG. 5 were negative. The actual processing is no different when compare to the RLE processing for non-picture blocks, discussed above, in that it does not matter what symbol breaks the run of zeros; the symbol can be either positive or negative.

The RLE encoder for picture blocks can be implemented in a number of ways, in either software or hardware. For instance, the RLE encoder used for non-picture blocks could be modified to also encode picture blocks, or the RLE encoder could be designed in such a way that the same encoder works in both capacities.

E. Mapping Negative Values

After the base layer 20 and any enhancement layers 22, 24, 26 are encoded, the (run, level) codes produced thereby are further coded by adaptive Golomb coding into a bitstream similar to the same process for non-picture blocks, shown in FIG. 5. Prior to encoding, however, any negative values remaining in the RLE encoded pairs can be converted into non-negative integers.

The negative numbers can be mapped into positive integers using an even/odd mapping as shown in FIG. 13. In this mapping, positive integers are mapped into an integer having twice the original value (y=2x), and negative integers are mapped into an odd value according to the equation: y=−(2x+1). For instance, if x is 3, then the newly mapped number will be 6, and if x is −3, then the newly mapped number will be 5. Similarly, if x is 9, then the newly mapped number will be 18, and if x is −9, then the newly mapped number will be 17.

Once all of the numbers have been converted into non-negative integers, they can then be coded by adaptive Golomb coding into the layered bitstreams to be sent to the scheduler 30 and decoder 40.

The value mapper can be implemented in a number of ways, in either software or hardware. The value mapper can be a standalone circuit, or can be a portion of an integrated circuit. It may be more convenient to implement the value mapper as a module, thread, or procedure running on a dedicated or general purpose processor, and having appropriate input and output variables.

Decoding of the Layers

Once the layers have been received by at the decoder 40 (FIG. 1), they are decoded into the originally coded image. Because the layers will arrive over a period of time, the decoder 40 builds the best quality image possible as the individual layers are received. For instance, when the decoder 40 receives the base layer 20, it will reproduce a coarse-quality representation of the original image. However, this coarse-quality image will be generated with very little delay, because the base layer 20 is purposely made to be small. After the base layer 20 has finished transmitting, the scheduler 30 transmits the first enhancement layer 22, and then the second enhancement layer 24. If there is enough bandwidth remaining before a new image must be sent, the scheduler 30 transmits any remaining enhancement layers 26, etc.

The decoder uses a variety of techniques to reconstruct the image. One such technique is simple pixel repetition. Because some embodiments encode the base layer 20 from a downsampling of the non-picture block, a decoding procedure can be used where the pixels are simply repeated a number of times to create the originally sized image. As enhancement layers are received, pixels that were generated by repetition are replaced by the actual data from the layers, thus producing the original image.

Other techniques of generating the coarse image from the base layer 20 exist. For example, pixels that are not directly mapped from the original block may be calculated, or predicted. One method of quickly calculating what to put in these pixels is an adaptive prediction. For example, as shown in FIG. 14, consider block data 550 (which is 3×3) received for an image 560 that is to be recreated as 6×6. In a first step, each of the pixels received in the block data 550 is mapped into the transformed image 560 according to the formula y(i,j)=x(2i,2j). Thus, the original pixels are mapped into the image as shown in FIG. 14. The remaining pixels must be adaptively predicted to determine which pixels to place in them.

For example, if g1=x(2i, 2j)−x(2i+2, 2j+2); and g2=x(2i+2, 2j)−x(2i, 2j+2), then g1 and g2 can be compared.

If the absolute value of g1 is less than the absolute value of g2, then the middle location, which for this example is the location (3,3), can be filled with the results of:

$$x(2i+1,2j+1)=\tfrac{1}{2}[x(2i,2j)+x(2i+2,2j+2)].$$

Otherwise, if the absolute value of g2 is less than the absolute value of g1, then $$x(2i+1,2j+1)=\tfrac{1}{2}[x(2i+2,2j)+x(2i,2j+2)].$$

The above equations will fill the pixel located at x(2i+1, 2j+1) with a value that is exactly in the middle of x(2i+2, 2j) and x(2i, 2j+2), although that is not necessarily the only value that can be placed in that location. Actually, any pixel value between and including the values located in x(2i+2,2j) and x(2i, 2j+2) can be used.

An application of the above equation is graphically shown in FIG. 14, where the distance between pixels A and E is g1, and the distance between the pixels B and D is g2. If g1 is smaller than g2, then the pixel placed in location (3,3) will be the average of pixels A and E. If g2 is smaller than g1, then the pixel placed in location (3,3) will be the average of pixels B and D.

This adaptive prediction is better than a simple averaging of all the pixels A, B, C, D. For instance, if pixel D was the last pixel in a blue letter, and pixels A, B and E were simply portions of a white background, then the above adaptive prediction equations would put another white pixel in the location (3,3) rather than a light blue pixel as would be the case if all of the colors A, B, C, D were simply averaged. Thus, a better degree of sharpness is maintained in the transformed image 560 than if a simple mapping plus averaging process used.

Once the locations between the mapped pixels in the transformed image 560 are defined, the remaining locations can be similarly defined. For instance, performing the first adaptive prediction will determine pixel colors for locations (3,3), (5,3), (3, 5) and (5,5), in addition to those locations already directly mapped (the locations of pixels A–I). Then, the color of the pixel at location (4,3) can be calculated by measuring the distance between the pixels B and E, against the distance between the already predicted pixels located at (3,3) and (5,3). The measuring and pixel color prediction continues until all of the pixels in the transformed image 560 are determined.

The decoder 40 can be implemented in a number of ways, in either software or hardware. Portions of the decoder 40 may be implemented in the decoder in ways other than the rest of the decoder. For instance, one portion of the decoder 40 may be used for decoding the base layer 20 only, while another portion of the decoder is structured to decode the enhancement layers 22, 24, 26. The decoder 40 can be a standalone circuit, or can be a portion of an integrated circuit. It may be more convenient to implement the decoder as a module, thread, or procedure running on a dedicated or general purpose processor, and having appropriate input and output variables.

Copy/Refresh Mode

As discussed with reference to steps 106, 108, and 110 of FIG. 2, embodiments of the invention include a process that compares blocks that are adjacent on the temporal axis to ensure that they have changed enough to warrant sending the additional data to re-create them, rather than simply re-displaying what the decoder 40 (FIG. 1) has already displayed for past blocks. In other words, if the current block has not changed, or changed very little compared to the past block that was already sent to the decoder 40 for a previous frame, then the current block is not additionally sent to the decoder, but rather only a signal that the past block shown should be shown again is sent.

Embodiments of the invention can include a change detection process that is performed on a pixel-by-pixel comparison between a block in the current frame and the same block in the previous frame according to an equation such as:

$$MAE_{avg} = \frac{1}{B^2} \sum_{i=1}^{B} \sum_{j=1}^{B} X_{cur}(i, j) - X_{ref}(i, j)$$

where Xcur and Xref correspond to the pixel in the current and previous, original frame, respectively, and where B is the number of bits along one edge of the current block.

If MAEavg is greater than a difference threshold, then the block is declared to need refreshing. If, however, the MAEavg is less than the threshold amount, then the Encoder 10 (FIG. 1) sends only an indication that the previous block can be used for the present block in the frame.

This copy/refresh mode saves the unnecessary overhead of sending bits for portions of the displayed image that do not change very much over time, for instance portions of a static background.

The refresh generator can be implemented in a number of ways, in either software or hardware. The refresh generator can be a standalone circuit, or can be a portion of an integrated circuit. It may be more convenient to implement the refresh generator as a module, thread, or procedure running on a dedicated or general purpose processor, and having appropriate input and output variables.

Figure 15:
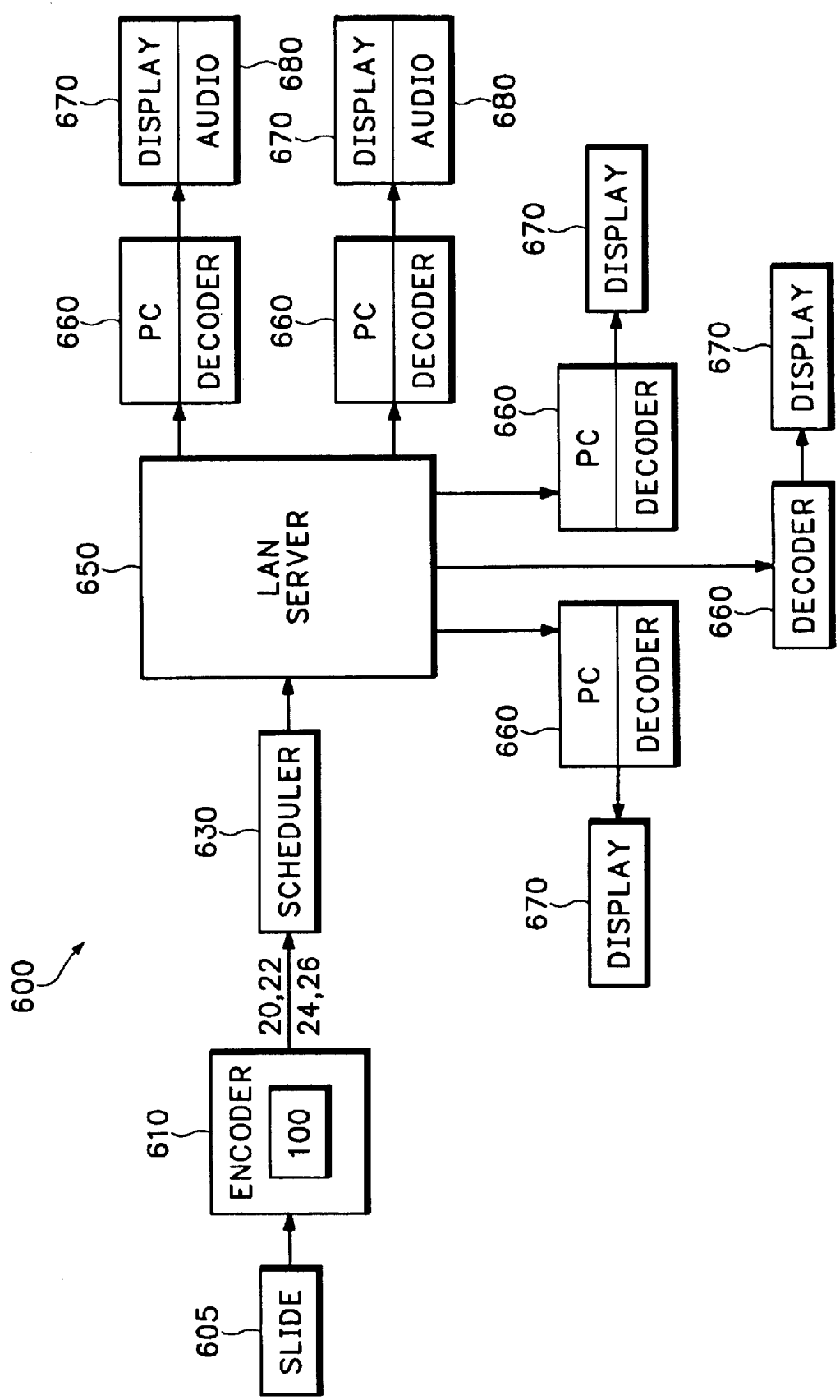
FIG. 15 is a block diagram showing an implementation of the data coding system as implemented in a computer network.

FIG. 15 shows a digital transmission system 600 capable of implementing embodiments of this invention. A data source 605 is used to create a data input stream. For example, the data source 605 could be a slide presentation system where a presenter is showing a set of static slides. The presenter, by using a switching device (not shown), can select between different slides in either a forward or backward direction. The slide show data, which may also contain audio in addition to the image data, is presented to an encoder 610 that encodes all of the slide show data into a base encoded layer 20 and three enhancement layers, 22, 24 and 26. The encoder 610 includes the flow 100 shown in FIG. 2 as described above, or another implementation method. The encoder 610 sends these encoded layers 20, 22, 24, 26 to a transmission scheduler 630. The output of the transmission scheduler 630 is sent to a media server 650, which could be a LAN server. The server 650 sends the encoded presentation data layers 20 and the enhancement layers 22, 24, 26 sequentially to multiple decoders 660. The decoders 660 generally run on their own Personal Computer (PC), but any implementation may be used, such as multiple decoders on a single PC, or a decoder running on a device that is not a PC. Connected to each of the decoders 660 is a display 670, used to show the slide presentation to a multitude of users. For instance, the display 670 may be a projecting display, such as an LCD or other form of projector, or may be a direct display, such as a standard Cathode Ray Tube (CRT). The display 670 may additionally be coupled to or include an audio portion 680 used to produce sounds that accompany the images shown on the display. In some embodiments, the decoders 660 only produce an output for the audio portion 680, and not for the display 670. These embodiments may be used when bandwidth of the network to which the decoders 660 are coupled is extremely restricted.

As discussed with reference to FIG. 1, the functional blocks shown in FIG. 15 do not necessarily show how the represented functions will be implemented. For instance, the encoder 610 could also include the scheduler 630 in the same device. Additionally, the media server 650 could be incorporated within the scheduler 630, with or without the encoder 610. Such implementation details are well known in the art and could be implemented by one skilled in the art without considerable experimentation.

In operation, as the presenter flips through slides in the data generator 605, the slides are encoded by the encoder 610 into a base layer encoding 20 as well as one or more enhancement layers 22, 24, 26. These layers are sent to the transmission scheduler 630 and scheduled for transmission. These transmissions are duplicated by the media server 650 and sent to each of the decoders 660, where the slide presentation is recreated on the respective displays 670. The decoders 660 will receive the base layer 20 with a very short delay and will make a low quality image from only the data in the base layer 20. Then, once other layers 22, 24, 26 have been received, the image is automatically updated to an image indistinguishable from the original coded image, as described above.

Although in FIG. 15 five displays 670 are shown, any number could be present within the system 600.

Additionally, the decoders 660 that are coupled to the displays 670 may be on the same network as the data generator 605, as shown in FIG. 15, or the decoders could be located far away from the data generator and only reachable through a distributed network.

The above-described data transmission system can be implemented in a variety of ways, while keeping within the scope of the invention. For instance, the system can use dedicated processor systems, micro controllers, programmable logic devices, or microprocessors that perform some or all of the coding, transmitting, and decoding operations. Some of the operations described above may be implemented in software and other operations may be implemented in hardware.

The details of determining how much bandwidth is available to the encoder 610 and setting the compression coefficients in the encoder is largely left to implementation, and the specific parameters may best be determined empirically. Parameters such as the number of bits in a block and the number of bits in a particular layer can all be optimized while staying within the scope of the invention.

Additionally, while described as a system for coding layers of data for transmission, the same considerations apply to coding pieces of layers, or packets of data containing layer information. Although it is possible that the entire layer be transmitted at one time, generally the layers can be thought of as being broken into packets prior to transmission and the packets reassembled into layers after transmission.

Having described and illustrated the principles of the invention in a preferred embodiment thereof, it should be apparent that the invention could be modified in arrangement and detail without departing from such principles. Claim is made to all modifications and variation coming within the spirit and scope of the following claims.

What is claimed is:

1. A method for coding compound frames of data to be sent over a transmission channel, comprising:
    accepting a frame of data at an input of a data coder;
    dividing the frame of data into one or more data blocks;
    classifying the one or more data blocks as either picture blocks or non-picture blocks according to a set of criteria;
    selecting either a picture block or a non-picture block as a next block to be coded;
    comparing the selected block to a block in a frame previous to the accepted frame;
    if the selected block is within a threshold difference of the block in the previous frame, generating a signal to use the block in the frame previous to the accepted frame, otherwise,
        if the selected block is a non-picture block, compressing the selected block using a first compression method, and dividing the selected block into at least two non-picture layers; and
        if the selected block is a picture block, compressing the selected block using a second compression method, and dividing the selected block into at least two picture layers.

2. The method of claim 1, further comprising selecting one of the group consisting of the signal to use the block in the frame previous to the accepted frame, the at least two non-picture layers, and the at least two picture layers as data to be transmitted over the transmission channel, and transmitting the selected data over the transmission channel.

3. The method of claim 1, wherein compressing the selected block using a first compression method and dividing the selected block into at least two non-picture layers comprises compressing the non-picture block into a base non-picture layer and at least one enhancement non-picture layer.

4. The method of claim 3, further comprising transmitting the base non-picture layer on the transmission channel prior to transmitting the at least one enhancement non-picture layer on the transmission channel.

5. The method of claim 3 wherein compressing the non-picture block into a base non-picture layer and at least one enhancement non-picture layer comprises losslessly compressing the non-picture block.

6. The method of claim 1 wherein dividing the selected block into at least two non-picture layers comprises downsampling the data in the non-picture block.

7. The method of claim 1 wherein compressing the selected block using a second compression method and dividing the selected block into at least two picture layers comprises compressing the picture block into a base picture layer and at least one enhancement picture layer.

8. The method of claim 7, further comprising transmitting the base picture layer on the transmission channel prior to transmitting the at least one enhancement picture layer on the transmission channel.

9. The method of claim 7 wherein compressing the picture block into a base picture layer and at least one enhancement picture layer comprises compressing the non-picture block using a lossy type compression.

10. The method of claim 1 wherein dividing the selected block into at least two picture layers comprises separating wavelet coefficients into at least two separate layers.

11. The method of claim 1 wherein classifying the one or more data blocks as either picture blocks or non-picture blocks according to a set of criteria comprises:
    choosing one of the one or more data blocks to classify;
    counting a number of discrete colors of pixels making up the chosen block;
    dividing the discrete colors into a dominant group and a non-dominant group based on a number of times the discrete colors appear in the chosen data block; and
    determining that the chosen block is a picture block if the number of counted discrete colors is above a threshold percentage of the total number pixels in the chosen block.

12. The method of claim 11 wherein the threshold percentage is a percentage selected from a range of about 10–40.

13. The method of claim 12 wherein the threshold percentage is 25.

14. The method of claim 11, further comprising determining that the chosen block is a picture block if the number of pixels having a color in the dominant group is fewer than a total threshold of a number of all of the pixels in the chosen block.

15. The method of claim 14 wherein the total threshold is a percentage selected from a range of about 80–85.

16. The method of claim 15 wherein the total threshold is 90 percent.

17. The method according to claim 2, wherein transmitting the selected data comprises transmitting the selected data on a LAN connection between two or more computers.

18. The method according to claim 2, wherein transmitting the selected data comprises transmitting the selected data from a media server to an image projector.

19. The method according to claim 2 wherein transmitting the selected data comprises transmitting the selected data from a media server to a decoding device.

20. A multi-layer coding system, comprising:
    a frame divider configured to break a frame of data into one or more data blocks;
    a block classifier configured to classify the one or more data blocks as either picture blocks or non-picture blocks;

a block comparer configured to compare one of the one or more data blocks to another block, and to generate a comparison signal at an output;

a re-use indicator coupled to the output of the block comparer and configured to generate a re-use signal based on the comparison signal;

a non-picture block compressor configured to compress and divide a non-picture block into a base non-picture layer and one or more non-picture enhancement layers using a first compression system; and a picture block compressor configured to compress and divide a picture block into a base picture layer and one or more picture enhancement layers using a second compression system.

21. The coding system of claim 20, further comprising a data transmitter structured to transmit data on a computer network.

22. The coding system of claim 21 wherein the data structured to be transmitted is selected from the group consisting essentially of the re-use signal, the base non-picture layer, the one or more non-picture enhancement layers, the picture block, and the one or more picture enhancement layers.

23. The coding system of claim 20 wherein the block comparer is configured to compare blocks from two different frames of data.

24. The coding system of claim 20 wherein the block classifier comprises a color quantizer and a color counter.

25. The coding system of claim 20 wherein the non-picture block compressor comprises:

a color palette indexer for generating an index value for colors of pixels making up the non-picture block; and a layer separator configured to divide indexed values of the non-picture block into two or more layers.

26. The coding system of claim 25 wherein the non-picture block compressor further comprises a run length encoder to encode the two or more layers into the base non-picture layer and the one or more non-picture enhancement layers.

27. The coding system of claim 26, wherein the non-picture block compressor further comprises a Golomb coder structured to convert an output from the run length encoder into the base non-picture layer and the one or more non-picture enhancement layers.

28. The coding system of claim 20 wherein the picture block compressor comprises:

a wavelet coder configured to generate wavelet values from the picture block; and a layer separator structured to divide the wavelet values into two or more layers.

29. The coding system of claim 20 wherein the picture block compressor comprises an integer based lowpass/highpass processor.

30. The coding system of claim 29 wherein the integer based lowpass/highpass processor comprises:

an average processor configured to produce an average value for a number of adjacent pixels in the picture block; and a difference processor configured to generate difference wavelet values for the number of adjacent pixels in the picture block.

31. The coding system of claim 28 wherein the picture block compressor further comprises a wavelet quantizer structured to scale the wavelet values.

32. The coding system of claim 28 wherein the picture block compressor further comprises a wavelet normalizer structured to normalize the wavelet values.

33. The coding system of claim 28 wherein the picture block compressor further comprises a wavelet remapper that is structured to map wavelet values into non-negative integer values.

34. The coding system of claim 28 wherein the picture block compressor further comprises a run length encoder to encode the two or more layers into the base picture layer and the one or more non-picture enhancement layers.

35. The coding system of claim 34, wherein the picture block compressor further comprises a Golomb coder structured to convert an output from the run length encoder into the base picture layer and the one or more picture enhancement layers.

36. A data transmission system, comprising:

a data encoder, including:

a frame divider configured to break a frame of data into one or more data blocks, a block classifier configured to classify the one or more data blocks as either picture blocks or non-picture blocks, a non-picture block compressor configured to compress and divide a non-picture block into a base non-picture layer and one or more non-picture enhancement layers using a first compression-division system, and a picture block compressor configured to compress and divide a picture block into a base picture layer and one or more picture enhancement layers using a second compression-division system;

a transmission scheduler coupled to the encoder and having an input terminal to accept encoded layers of data, and having an output terminal coupled to a transmission channel; and a server coupled to the transmission channel and structured to distribute the encoded layers of data to one or more receiving units.

37. The data transmission system of claim 36 wherein the block classifier in the data encoder comprises a color quantizer and a color counter.

38. The data transmission system of claim 36 wherein the non-picture block compressor comprises:

a color palette indexer for generating an index value for colors of pixels making up the non-picture block; and a layer separator configured to divide indexed values of the non-picture block into two or more layers.

39. The data transmission system of claim 36 wherein the picture block compressor comprises:

a wavelet coder configured to generate wavelet values from the picture block;

a layer separator structured to divide the wavelet values into two or more layers.

40. The data transmission system of claim 39 wherein the wavelet coder comprises:

an average processor configured to produce an average value for a number of adjacent pixels in the picture block; and a difference processor configured to generate difference wavelet values for the number of adjacent pixels in the picture block.

41. The data transmission system of claim 36 wherein the picture block compressor further comprises a wavelet quantizer structured to scale the wavelet values.

* * * * *

UNITED STATES PATENT AND TRADEMARK OFFICE
CERTIFICATE OF CORRECTION

PATENT NO. : 6,898,313 B2  Page 1 of 1
APPLICATION NO. : 10/092851
DATED : May 24, 2005
INVENTOR(S) : Li et al.

It is certified that error appears in the above-identified patent and that said Letters Patent is hereby corrected as shown below:

Column 11, line 23, please replace "process.  The individual" with --process. ¶ The individual--

Signed and Sealed this

Second Day of January, 2007

JON W. DUDAS
*Director of the United States Patent and Trademark Office*